United States Patent
Brouillard et al.

(10) Patent No.: US 7,410,576 B2
(45) Date of Patent: Aug. 12, 2008

(54) MOBILE FILTRATION SYSTEM AND METHOD

(75) Inventors: Marc-André Brouillard, Montréal (CA); Gastan Brouillard, St-Georges de Windsor (CA)

(73) Assignee: E.R.I. Technologies, St-Georges de Windsor, Quebec (CA)

( * ) Notice: Subject to any disclaimer, the term of this patent is extended or adjusted under 35 U.S.C. 154(b) by 0 days.

(21) Appl. No.: 11/582,310

(22) Filed: Oct. 18, 2006

(65) Prior Publication Data

US 2007/0034578 A1  Feb. 15, 2007

Related U.S. Application Data

(63) Continuation of application No. 11/176,219, filed on Jul. 8, 2005, now abandoned.

(60) Provisional application No. 60/585,844, filed on Jul. 8, 2004.

(51) Int. Cl.
*B01D 29/25* (2006.01)
*C02F 11/12* (2006.01)

(52) U.S. Cl. .................. 210/241; 210/455; 210/484

(58) Field of Classification Search .................. None
See application file for complete search history.

(56) References Cited

U.S. PATENT DOCUMENTS

| | | | | |
|---|---|---|---|---|
| 1,331,239 A | * | 2/1920 | Cartwright | 210/241 |
| 1,331,900 A | * | 2/1920 | Cartwright | 210/408 |
| 1,343,471 A | * | 6/1920 | Otterson | 210/241 |
| 1,437,007 A | * | 11/1922 | Otterson | 210/241 |
| 1,708,656 A | * | 4/1929 | Bradshaw | 122/491 |
| 2,649,965 A | * | 8/1953 | King et al. | 210/241 |
| 2,712,797 A | * | 7/1955 | Woehrle et al. | 296/39.1 |
| 2,990,036 A | * | 6/1961 | Dubie | 52/194 |
| 3,040,925 A | * | 6/1962 | Mills | 220/1.5 |
| 3,133,492 A | * | 5/1964 | Czulak et al. | 100/110 |
| 3,159,420 A | * | 12/1964 | McCrossen | 296/183.1 |
| 3,357,575 A | * | 12/1967 | Zuber et al. | 414/325 |
| 3,421,665 A | * | 1/1969 | Paton | 222/386.5 |
| 3,578,213 A | * | 5/1971 | Clarke et al. | 222/95 |
| 3,595,175 A | * | 7/1971 | Austill | 105/243 |
| 3,666,312 A | * | 5/1972 | Harris | 296/183.2 |
| 3,696,952 A | * | 10/1972 | Bodenheimer | 414/421 |
| 3,756,469 A | * | 9/1973 | Clark et al. | 222/105 |
| 3,794,164 A | * | 2/1974 | Ginaven | 209/243 |
| 3,941,258 A | * | 3/1976 | Ide | 414/304 |
| 3,970,552 A | * | 7/1976 | Bongert | 210/780 |
| 3,980,196 A | * | 9/1976 | Paulyson et al. | 220/1.5 |

(Continued)

*Primary Examiner*—Robert James Popovics
(74) *Attorney, Agent, or Firm*—Ogilvy Renault LLP

(57) ABSTRACT

A filtration system comprising a floor panel and a plurality of wall panels connected to each other to define a box, at least one filtering wall vertically inclined and supported inward of a corresponding wall panel such as to define a first free space therebetween, a filtering floor horizontally inclined and supported above the floor panel such as to define a second free space therebetween, the filtering floor being connected to the filtering wall to define a filter chamber, a plurality of openings defined in the filtering wall and the filtering floor sized to let a liquid pass through and retain at least one target solid within the filter chamber, an inlet in fluid communication with the filter chamber, and an outlet in fluid communication with the first and second free spaces. A method of filtering at least one target solid from a liquid is also provided.

6 Claims, 7 Drawing Sheets

U.S. PATENT DOCUMENTS

| | | | |
|---|---|---|---|
| 4,046,689 A * | 9/1977 | Argyll | 71/12 |
| 4,054,226 A * | 10/1977 | Bjelland et al. | 220/1.6 |
| 4,082,672 A * | 4/1978 | Petroski | 210/205 |
| 4,189,386 A * | 2/1980 | Aman | 210/235 |
| 4,200,535 A * | 4/1980 | Kennedy, Jr. | 210/241 |
| 4,340,477 A * | 7/1982 | Hobson et al. | 210/241 |
| 4,385,953 A * | 5/1983 | Beck | 156/200 |
| 4,414,335 A * | 11/1983 | Kipp, Jr. | 435/290.4 |
| 4,426,020 A * | 1/1984 | Presseau et al. | 222/108 |
| 4,453,645 A * | 6/1984 | Usui et al. | 220/530 |
| 4,461,402 A * | 7/1984 | Fell et al. | 222/105 |
| 4,523,936 A * | 6/1985 | Disanza, Jr. | 55/429 |
| 4,541,765 A * | 9/1985 | Moore | 414/267 |
| 4,623,197 A * | 11/1986 | Stluka | 298/10 |
| 4,671,733 A * | 6/1987 | Krein | 414/809 |
| RE32,788 E * | 11/1988 | Disanza, Jr. | 55/429 |
| 4,871,454 A * | 10/1989 | Lott | 210/205 |
| 4,909,156 A * | 3/1990 | Erickson | 105/359 |
| 4,929,353 A * | 5/1990 | Harris | 210/237 |
| 4,944,873 A * | 7/1990 | Williams | 210/209 |
| 5,021,156 A * | 6/1991 | Sloan | 210/241 |
| 5,024,346 A * | 6/1991 | Roser | 220/9.1 |
| 5,098,364 A * | 3/1992 | Schilling | 493/200 |
| 5,110,005 A * | 5/1992 | Schilling | 220/495.08 |
| 5,156,749 A * | 10/1992 | Williams | 210/770 |
| 5,183,086 A * | 2/1993 | Fanta et al. | 141/10 |
| 5,193,453 A * | 3/1993 | Lundy | 100/100 |
| 5,234,309 A * | 8/1993 | Foster | 414/525.9 |
| 5,312,162 A * | 5/1994 | Baebel | 298/1 B |
| 5,336,408 A * | 8/1994 | Tsutumi | 210/384 |
| 5,489,037 A * | 2/1996 | Stopper | 220/1.5 |
| 5,514,286 A * | 5/1996 | Crosby | 210/742 |
| 5,553,980 A * | 9/1996 | Podd | 406/38 |
| 5,589,081 A * | 12/1996 | Harris | 210/804 |
| 5,595,654 A * | 1/1997 | Caughman, Jr. | 210/323.1 |
| 5,597,732 A * | 1/1997 | Bryan-Brown | 435/290.4 |
| 5,624,049 A * | 4/1997 | Kovash et al. | 220/1.5 |
| 5,681,460 A * | 10/1997 | Caughman, Jr. | 210/232 |
| 5,685,978 A * | 11/1997 | Petrick et al. | 210/241 |
| 5,707,535 A * | 1/1998 | Harris | 210/804 |
| 5,741,208 A * | 4/1998 | Moak | 493/195 |
| 5,746,862 A * | 5/1998 | Derby | 156/198 |
| 5,776,567 A * | 7/1998 | Schilling et al. | 428/34.5 |
| 5,803,531 A * | 9/1998 | Nielsen | 296/184.1 |
| 5,823,225 A * | 10/1998 | Erickson et al. | 137/347 |
| 5,858,226 A * | 1/1999 | Caughman, Jr. | 210/232 |
| 5,944,993 A * | 8/1999 | Derrick et al. | 210/388 |
| 5,975,642 A * | 11/1999 | Dibble et al. | 298/17 R |
| 5,983,957 A * | 11/1999 | Erickson | 141/7 |
| 6,004,461 A * | 12/1999 | Harris | 210/241 |
| 6,067,900 A * | 5/2000 | Lackner et al. | 100/111 |
| 6,146,528 A * | 11/2000 | Caughman et al. | 210/236 |
| 6,258,268 B1 * | 7/2001 | Lake | 210/238 |
| 6,281,001 B1 * | 8/2001 | McNelly | 435/262 |
| 6,303,032 B1 * | 10/2001 | Genduso | 210/232 |
| 6,364,122 B1 * | 4/2002 | Massey | 210/455 |
| 6,562,233 B1 * | 5/2003 | Schilling et al. | 210/164 |
| 6,627,434 B1 * | 9/2003 | McNelly | 435/290.1 |
| 6,911,145 B2 * | 6/2005 | Hutchinson et al. | 210/258 |
| 7,045,068 B2 * | 5/2006 | Hutchinson et al. | 210/808 |
| 7,178,675 B2 * | 2/2007 | Votel | 210/473 |
| 7,179,377 B1 * | 2/2007 | Caughman, Jr. | 210/232 |
| 7,198,156 B2 * | 4/2007 | Schulte et al. | 209/309 |
| 2004/0011749 A1 * | 1/2004 | Hutchinson et al. | 210/808 |
| 2006/0011561 A1 * | 1/2006 | Brouillard et al. | 210/767 |
| 2007/0034578 A1 * | 2/2007 | Brouillard et al. | 210/767 |

* cited by examiner

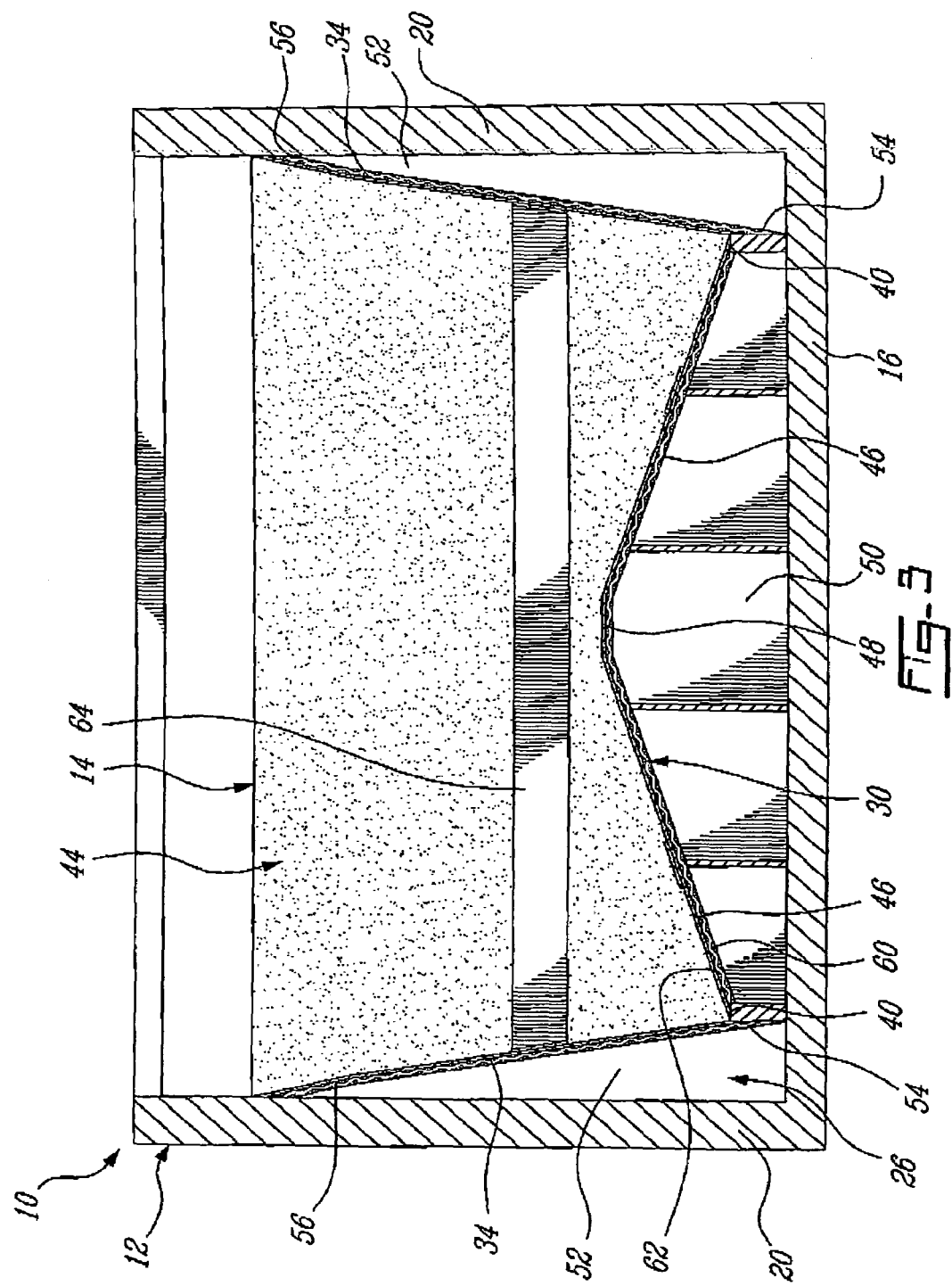

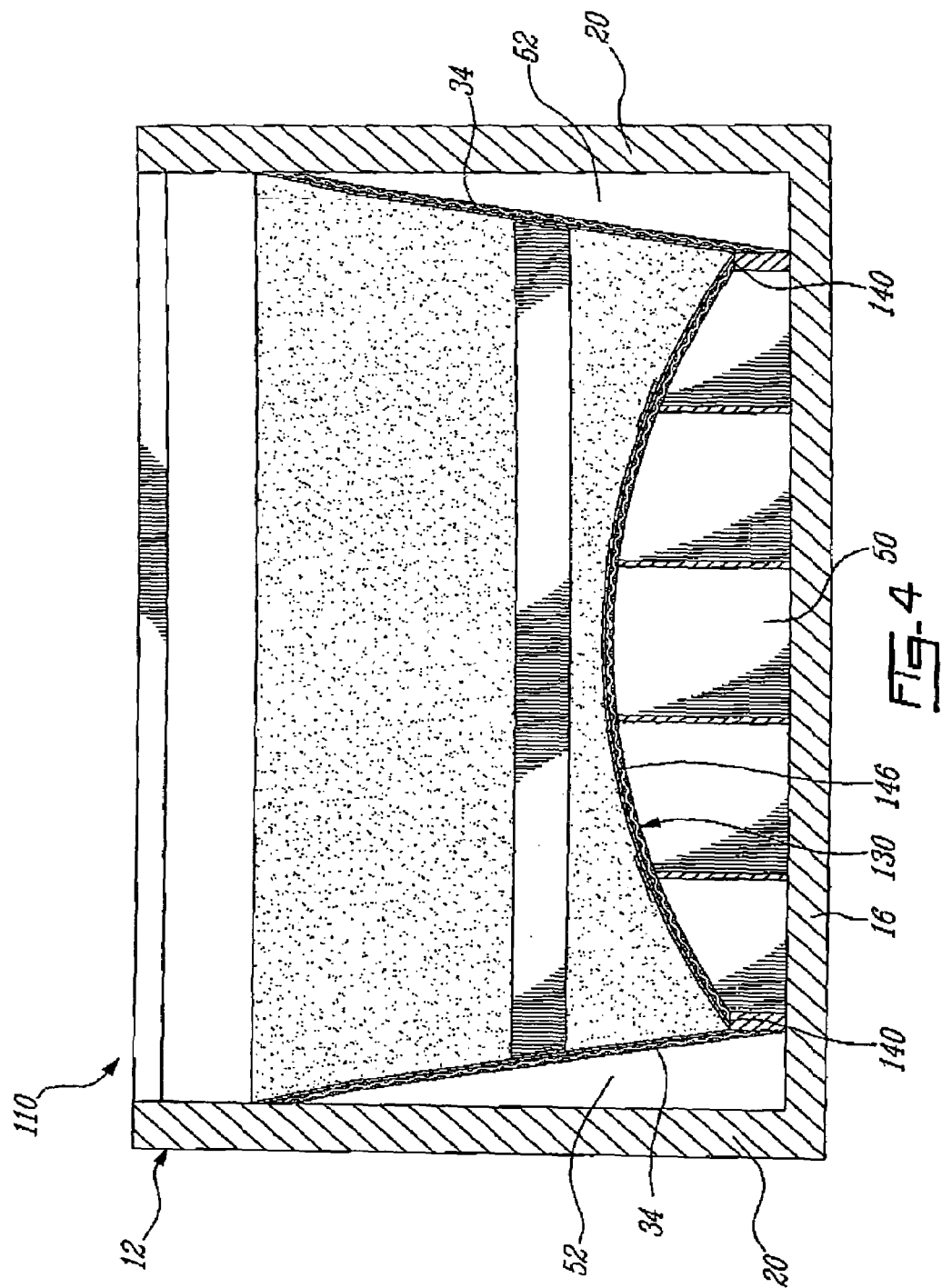

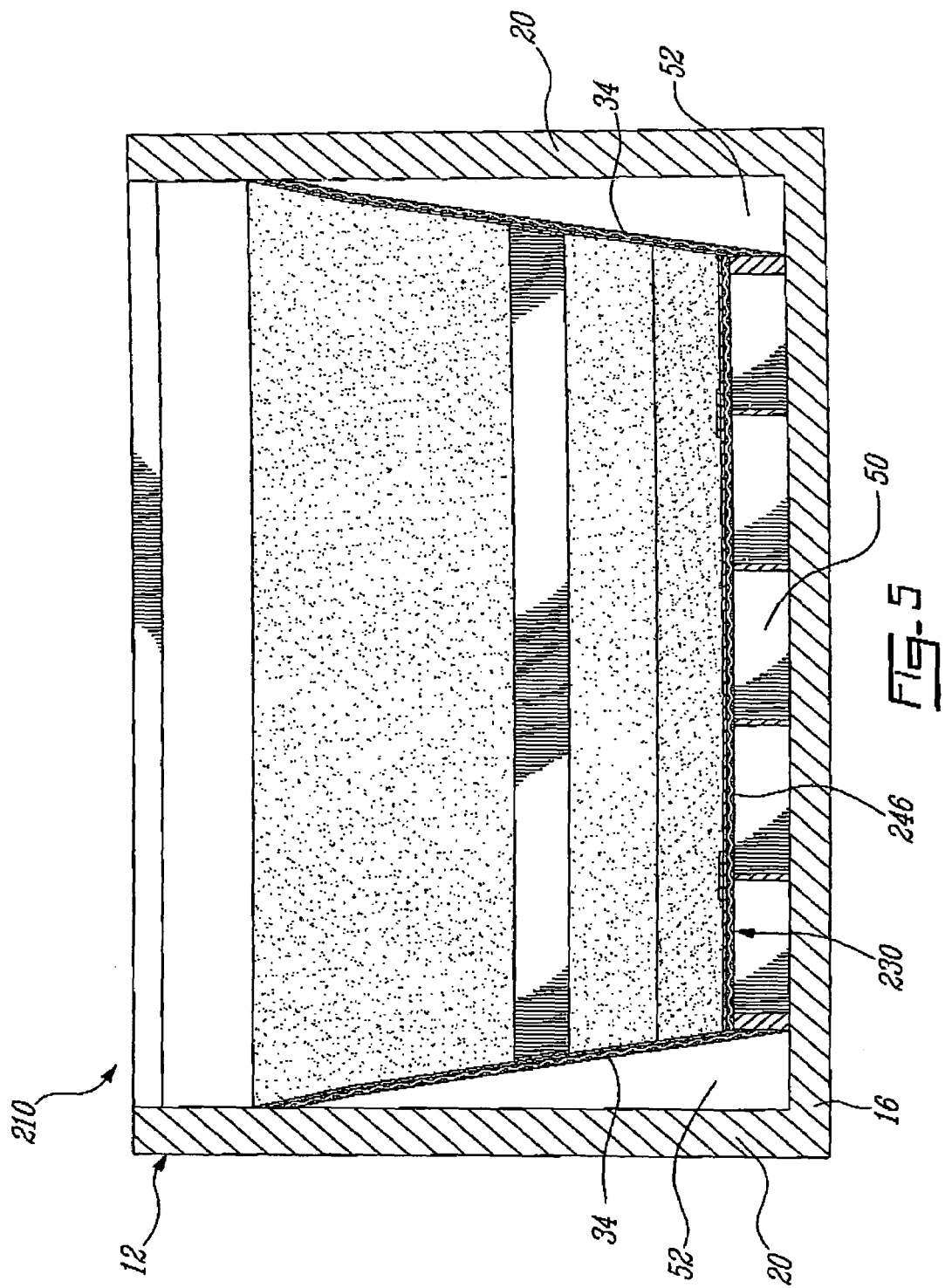

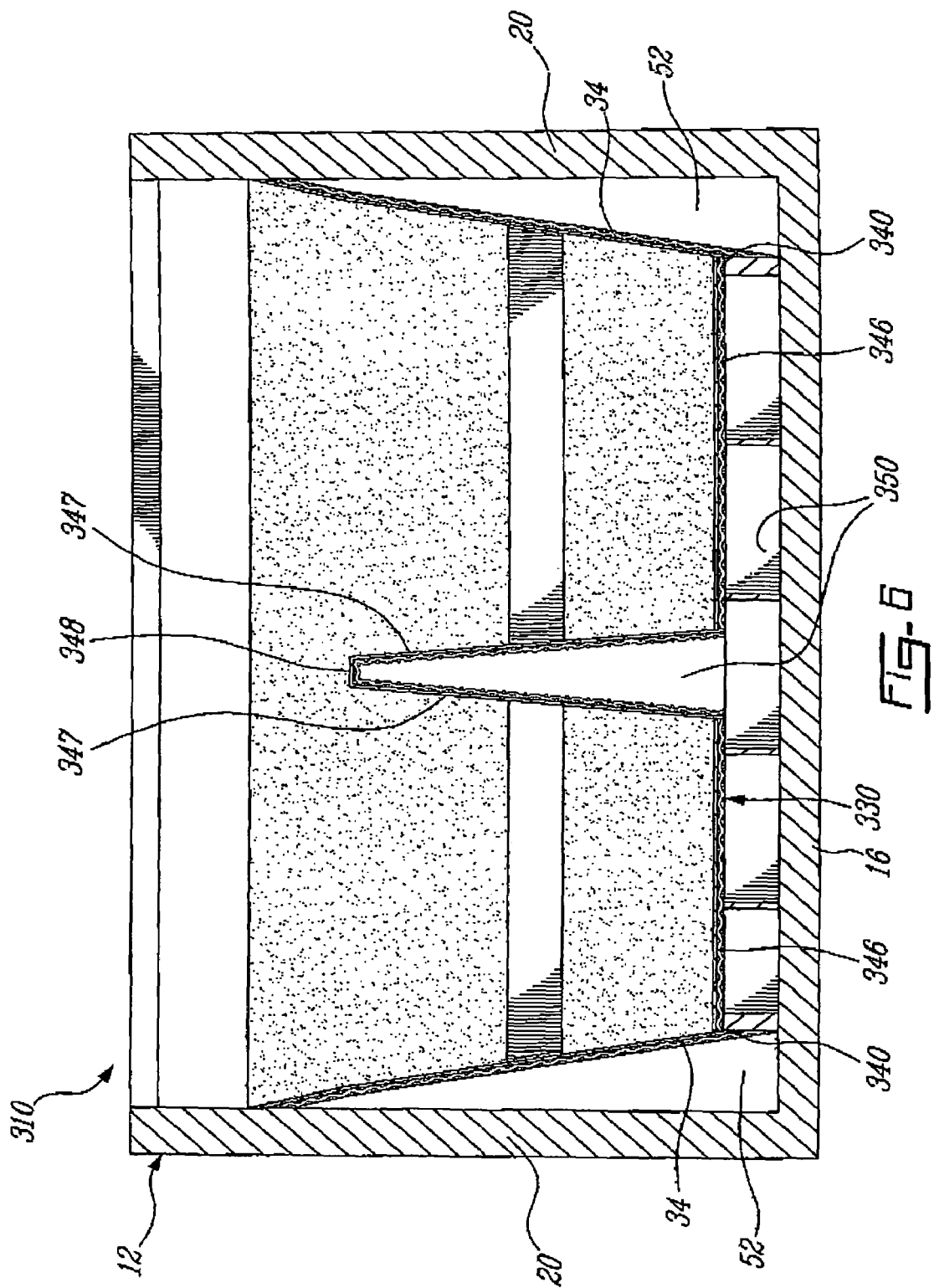

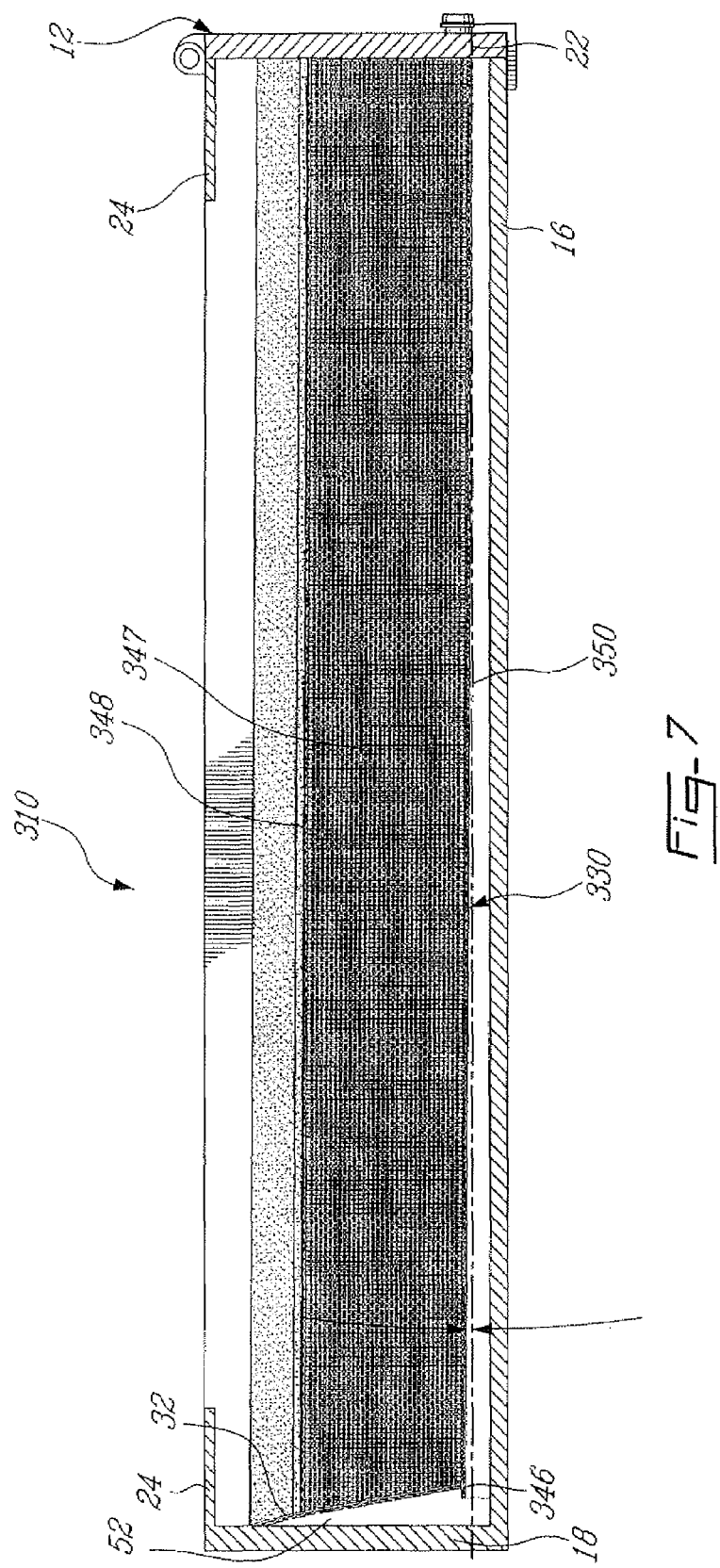

МОБILE FILTRATION SYSTEM AND METHOD

CROSS-REFERENCE TO RELATED APPLICATIONS

This is a continuation of U.S. patent application Ser. No. 11/176,219 filed on Jul. 8, 2005 now abandoned, and claiming the benefit of U.S. Provisional Patent Application No. 60/585,844 filed on Jul. 8, 2004, which are both herein incorporated by reference.

FIELD OF THE INVENTION

The present invention relates to filtration systems, particularly to such systems using gravitational drainage to filter at least one target solid from a liquid for separate disposal or recovery.

BACKGROUND ART

Numerous industrial processes produce waste material in the form of a sludge which is composed of a liquid and at least one solid that must be separated for disposal or recovery of the components. Examples of such waste material include waste from animal or vegetal agri-food industries, manure, industrial sludge from fabrication processes of various products, used water, wet contaminated soil, etc. Typically, the liquid is separated from the solid using a filter which will retain the solid and let the liquid pass through. Generally, the fluid can be drawn through the filter either by gravity or by the use of a vacuum produced by a pump.

There exists a number of filter assemblies located within a mobile box, with a free space in the box around the filter assembly for receiving the liquid, such as is described in U.S. Pat. Nos. 4,929,353 and 6,004,461, both to Harris, and U.S. Pat. No. 6,258,268 to Lake. Although such assemblies rely on gravity to extract the liquid from the sludge through the filter bed, the side filters, which are vertical, rely mainly on capillary action to force the liquid therethrough, which is slower and less efficient.

In addition, the systems presented in these patents usually require the change of filter material and/or mesh size when the nature of the material to be filtered is changed, thus preventing the manufacture of standard filter panels than can be employed with a variety of materials to be filtered.

Accordingly, there is a need for a mobile gravitational filtration system with increased efficiency, which can use standard filter panels for a variety of materials to be filtered.

SUMMARY OF THE INVENTION

It is therefore an aim of the present invention to provide a gravitational filtration system having an increased efficiency.

It is another aim of the present invention to provide a filtration system with filtering walls using gravity to separate a liquid from at least one target solid.

It is a further aim of the present invention to provide a filtration system comprising standard filtration panels adapted for a variety of materials to be filtered.

Therefore, in accordance with the present invention, there is provided a filtration system for separating at least one target solid from a liquid, the filtration system comprising a floor panel, a plurality of wall panels, the wall panels being connected to each other and to the floor panel to define a box, at least one filtering wall inclined with respect to a vertical plane such that a bottom edge thereof is located inward of a top edge thereof, the at least one filtering wall being supported inward of a corresponding one of the wall panels such as to define a first flee space therebetween, a filtering floor inclined with respect to a horizontal plane along a first direction and supported above the floor panel such as to define a second free space therebetween, the filtering floor being connected to the at least one filtering wall to define a filter chamber, a plurality of openings defined in the at least one filtering wall and the filtering floor, the plurality of openings being sized to let the liquid pass through and retain the at least one target solid within the filter chamber, an inlet in fluid communication with the filter chamber, and an outlet in fluid communication with the first and second free spaces, whereby the liquid and the at least one target solid enter the filter chamber through the inlet in a mixed state, the at least one target solid being retained within the filter chamber while the liquid reaches the first and second free spaces through the plurality of openings before being evacuated through the outlet.

Also in accordance with the present invention, there is provided a method of filtering at least one target solid from a liquid comprising the steps of providing a box having a floor panel and a plurality of wall panels, determining the nature of the liquid and target solid, selecting a filtering floor according to the nature of the liquid and target solid, installing the filtering floor above the floor panel such as to define a first free space therebetween, selecting an inclination angle for at least one filtering wall according to the nature of the liquid and target solid, installing the filtering wall inward of a corresponding one of the wall panels and at the selected inclination angle such as to define a second free space therebetween, connecting the filtering wall to the filtering floor to define a filter chamber, and pouring the liquid and target solid in the filter chamber so that the target solid is retained therein while the liquid passes through at least one of the filtering floor and filtering wall to be collected in at least one of the first and second free spaces.

Further in accordance with the present invention, there is provided a filtration system to filter a sludge, the filtration system comprising a box having impermeable bottom and side walls to form a container, at least a first filtration panel spaced from the bottom wall and defining a first plenum therebetween, the first filtration panel having a slope relative to a horizontal plane in a predetermined direction, at least a second filtration panel spaced from one of the side walls and defining a second plenum therebetween, the second filtration panel having an inward slope relative to a vertical plane, the first and second filtration panels being such as to permit a liquid from the sludge to pass through to the respective plenums while retaining a least one solid from the sludge above the filtration panels, and means for draining the liquid from the first and second plenums.

BRIEF DESCRIPTION OF THE DRAWINGS

Reference will now be made to the accompanying drawings, showing by way of illustration a preferred embodiment of the present invention and in which:

FIG. 3 is a front view, in cross-section, of the filtration system of FIG. 1;

FIG. 4 is a front view, in cross-section, of a filtration system according to a first alternative embodiment of the present invention;

FIG. 5 is a front view, in cross-section, of a filtration system according to a second alternative embodiment of the present invention;

FIG. 6 is a front view, in cross-section, of a filtration system according to a third alternative embodiment of the present invention; and FIG. 7 is a side view, in cross-section. of the filtration system of FIG. 6.

DESCRIPTION OF THE PREFERRED EMBODIMENTS

Figure 1:
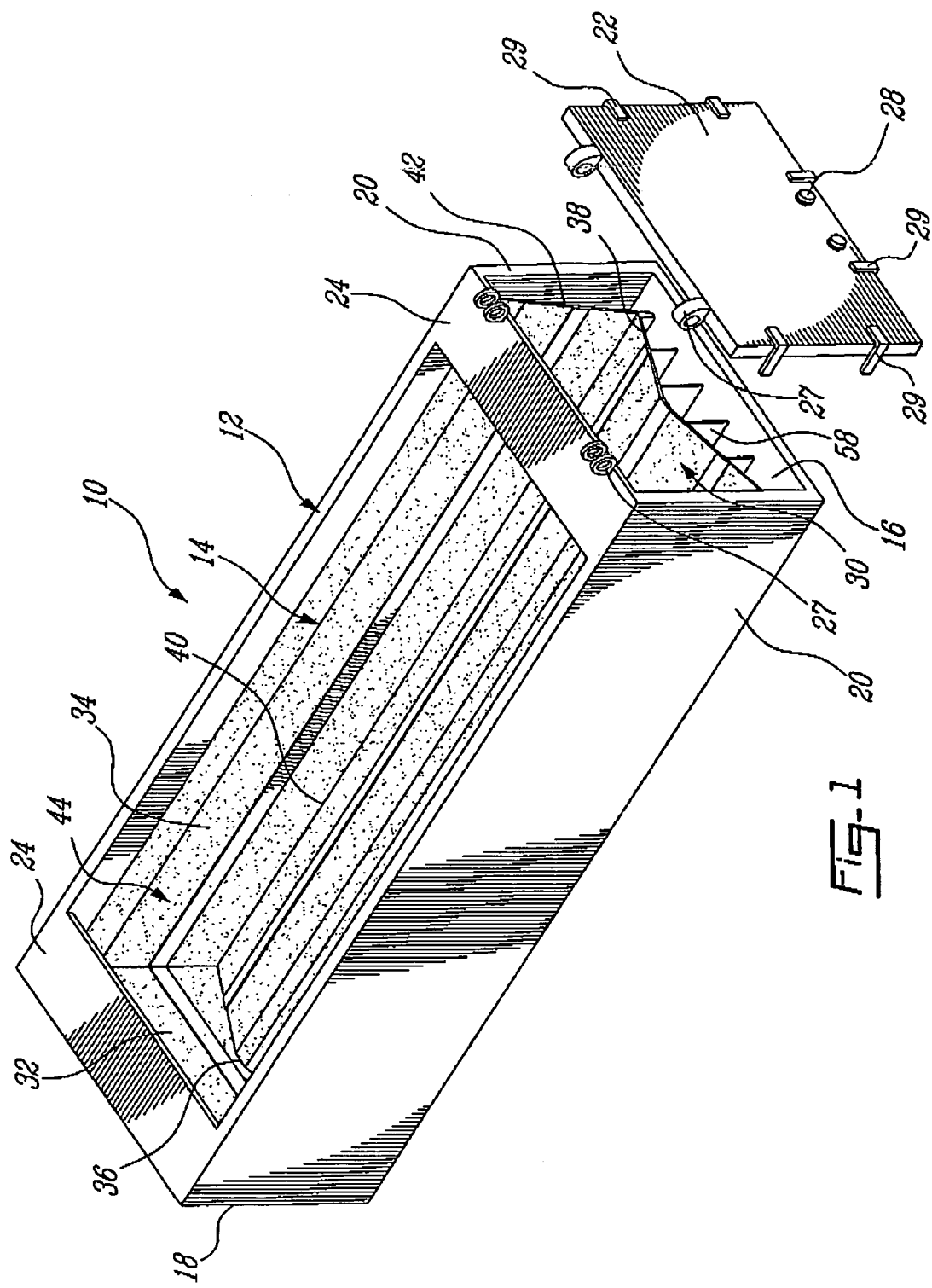
FIG. 1 is a perspective view of a filtration system according to a preferred embodiment of the present invention.
Figure 2:
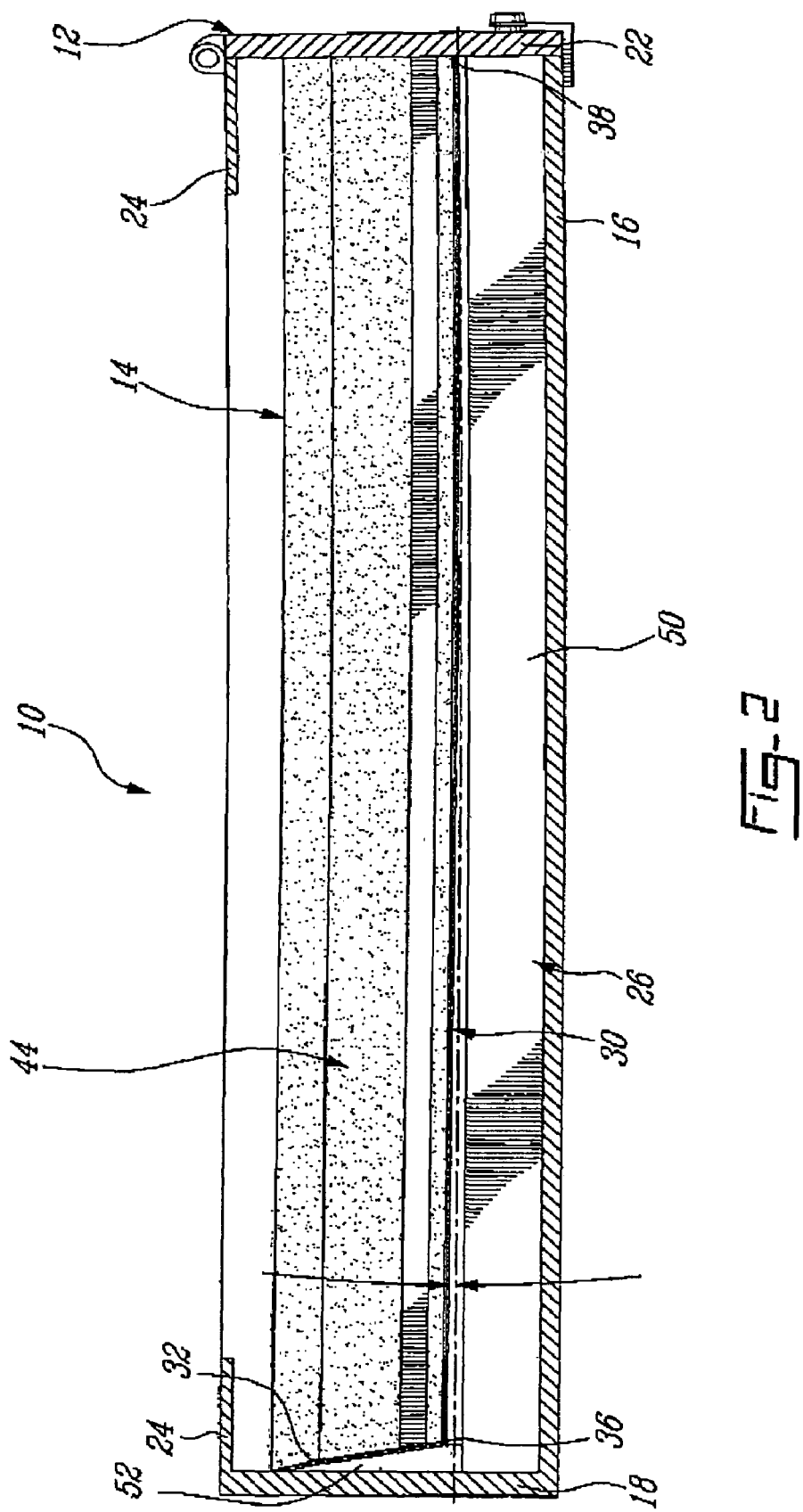
FIG. 2 is a side view, in cross-section, of the filtration system of FIG. 1.

Referring now to FIGS. 1-3, a filtration system 10 according to a preferred embodiment of the present invention is shown. The filtration system 10 comprises a box 12 receiving therein a filtering assembly 14.

The box 12 includes a floor panel 16, a front wall panel 18, two side wall panels 20, a rear wall panel 22 and two top wall panel portions 24. The wall panels 18,20,22, top panels portions 24 and floor panel 16 are rectangular and interconnected to define a sealed enclosure 26 having a partially open top. Preferably, the wall panels 18,20,22 extend perpendicularly to the floor panel 16 and to the top wall panel portions 24.

The box 12 is preferably a truck box of a roll-off type, such as to be carried by a truck. Alternatively, the box 12 can be a trailer such as to be directly towed by a vehicle. The rear wall panel 22 is connected to the rear top wall panel portion 24 through hinges 27 such as to be openable to facilitate cleaning of the enclosure 26 and filtering assembly 14. The rear wall panel 22 is maintained in a sealed closed position by a plurality of locks 29 engaging the side wall panels 20 and floor panel 16. Alternatively, the rear wall panel 22 can be hingedly connected to one of the side wall panels 20 or to the floor panel 16, or be completely removable.

The rear wall panel 22 includes at least one and preferably two to four outlets 28 along a bottom part thereof, the outlets 28 being alternatively opened and closed by appropriate means such as valves or removable caps. The partially open top acts as an inlet to the box 12. Alternatively, the box 12 can have a closed top with an inlet, such as a pipe, incorporated therein.

The floor and wall panels 16,18,20,22,24 of the box 12 are preferably made of metal such as steel or aluminium.

The filtering assembly comprises a filtering floor 30, a front filtering wall 32, and two side filtering walls 34. The filtering walls 32,34 are preferably rectangular. The filtering floor 30 has a front edge 36 connected to the front filtering wall 32, side edges 40 that are each connected to a respective one of the side filtering walls 34, and a rear edge 38 sealingly engaged to the rear wall panel 20. The filtering walls 32,34 are connected to each other and the side filtering walls 34 each have a rear edge 42 sealingly engaged to the rear wall panel 20. Thus, a filter chamber 44 is defined by the filtering walls 32,34, the filtering floor 30 and the rear wall panel 20. It is also contemplated to provide a rear filtering wall similar to the front filtering wall 32 or to use fewer filtering walls, e.g. omitting the front filtering wall 32 and sealingly engaging a front edge of each of the side filtering walls 34 to the front wall panel 18.

As can be best seen in FIG. 3, the filtering floor 30 includes two vertically inclined filtering panels 46, each having a bottom edge forming one of the side edges 40 of the filtering floor 30. The filtering panels 46 are inclined toward each other with top edges thereof connected by a filtering strip 48. It is also contemplated to have the top edges of the filtering panels 46 directly connected to each other.

The filtering floor 30 is supported above the floor panel 16, such as by metal channels, to define a first free space 50, or plenum, under the filter chamber 44, between the filtering floor 30 and floor panel 16. The first free space 50 is in fluid communication with the outlets 28 defined in the rear wall panel 22. As can be best seen in FIG. 2, the filtering floor 30 is inclined with respect to a horizontal plane (shown in broken lines) to improve filtration by minimizing stagnation of solid waste on the filtering floor 30. The front edge is 36 preferably higher than the rear edge 38 to facilitate cleaning of the filter chamber 44 through the open rear wall panel 22. A preferred inclination is represented by a height difference between the front edge 36 and the rear edge 38 of between 19.05 and 50.8 millimeters (¾ inch and 2 inches, respectively), for a filtering floor having a length of 8.5 meters (28 feet).

Referring to FIG. 3, each of the side filtering walls 34 extends inward of a respective one of the side wall panels 20 such as to define a second free space 52, or plenum, therebetween. The side filtering walls 34 are vertically inclined, with a bottom edge 54 thereof located inward of a top edge 56 thereof. Preferably, the top edge 56 is connected to the corresponding side wall panel 20. A preferred inclination is represented by the filtering side wall 34 forming an angle of about 10 degrees with the vertical side wall panel 20. As seen in FIG. 2, the front filtering wall 32 similarly extends inward of the front wall panel 18 in a vertically inclined position, the second free space 52 thus being defined around the front and sides of the filter chamber 44. The second free space 52 is in fluid communication with the outlets 28 through the first free space 50.

The filtering floor and walls 30,32,34 are preferably made of an outer structural frame 58 (see FIG. 1) supporting a wire mesh 60 (see FIG. 3) which, in turn, supports a filtering membrane 62 (see FIG. 3) forming the inner surface of the filter chamber 44. The structural frame 58 is preferably composed of metal channels. The wire mesh 60 is preferably metallic, with openings having a size between 6.35 and 25.4 millimeters (¼ and 1 inch). Preferred metals for the structural frame 58 and wire mesh 60 are stainless steel and aluminium. The filtering membrane 62 is preferably made of Textilene™, with openings having a diameter between 0.1 to 1 millimeter. The structural frame 58, wire mesh 60 and filtering membrane 62 are interconnected through means well known in the art, one example being the use of flat metal strips 64 (see FIG. 3) placed over the membrane 62 and screwed into the frame 58 such as to sandwich the membrane 62 and mesh 60 therebetween.

In operation, and with the rear wall panel 22 closed, a mix of a liquid and at least one solid is poured into the filter chamber 44 through the inlet or partially open top of the box 12. Under the action of gravity, the liquid passes through the filtering membrane 62 of the filtering floor and walls 30,32,34 to reach the first and second free spaces 50,52. The liquid accumulates in the bottom of the box 12, in the first free space 50, and is removed from the box 12 through the outlets 28. The solid is retained by the filtering membrane 62 within the filter chamber 44 where it is accumulated. As stated above, the angle of the filtering floor 30 with respect to the horizontal minimizes stagnation of the solid waste, thereby reducing clogging of the membrane 62 and improving the flow of liquid therethrough. The angle of the filtering walls 34 with respect to the vertical increases the filtering efficiency by allowing the use of gravity to force the liquid therethrough, instead of relying mainly on capillary action.

When the filter chamber 44 is full of solid waste, and the liquid has been removed through the outlets 28, the box 12 can be appropriately mounted on a truck (not shown) to be moved to a dump site, where the solid can be removed from the filter chamber 44 through the open rear wall panel 22. The cleaning process can be facilitated if the truck has means to incline the box 12 by elevating a front end thereof, as is well known in the art.

Applicants have found that although the filtering system 10 is adapted to filter a variety of materials, preferable uses therefor include the filtration of waste from animal agri-food industries and wet contaminated soil.

Now referring to FIGS. 4-6, three alternative embodiments of the present invention are shown. Most of the elements of these alternative filtration systems are similar to the elements of the filtration system 10 of FIGS. 1-3, and as such are represented by the same reference numerals. The difference between the alternative filtration systems and the first filtration system 10 resides in the shape of the filtering floor.

Referring to FIG. 4, the filtering floor 130 of the first alternative filtration system 110 is composed of a single filtering panel 146 which is semi-circular in shape. The filtering panel 146 is curved so that its lowest points are located along the side edges 140 of the filtering floor 130. This embodiment is preferably used for filtering waste such as pig manure or industrial sludge.

Referring to FIG. 5, the filtering floor 230 of the second alternative filtration system 210 is composed of a single filtering panel 246 which is flat. This embodiment is preferably used for rapid filtration processes, such as the filtration of used water or waste from vegetal agri-food industries.

Referring to FIG. 6, the filtering floor 330 of the third alternative filtration system 310 is composed of two flat filtering panels 346, each flat filtering panel 346 having one longitudinal edge forming the side edge 340 of the filtering floor 330 and another longitudinal edge connected to a vertically inclined filtering panel 347. The inclined filtering panels 347 are inclined toward each other with top edges thereof connected by a filtering strip 348. It is also considered to have the top edges of the inclined filtering panels 347 directly connected to each other. The first free space 350 extends under the filtering floor 330 and between the filtering panels 347. This embodiment is preferably also used for rapid filtration processes such as the filtration of used water or waste from vegetal agri-food industries, and for slower filtration processes such as the filtration of waste from animal agri-food industries.

All of these alternative embodiments 110,210,310 function following the operational steps described above for the filtration system 10. Like the filtering floor 30, the filtering floors 130,230,330 are preferably composed of an outer structural frame supporting a wire mesh supporting a filtering membrane. Also like the filtering floor 30, the filtering floors 130,230,330 are supported above the floor panel 16 such as to define a first free space therebetween, and are inclined with respect to a horizontal plane, as shown for example in FIG. 7.

Before installation within the box 12, the type of filtering floor and the inclination of the filtering walls 32,34 are thus selected according to the nature of the material to be filtered. For materials that are more difficult or slower to filter (e.g. materials with a high grease content, a high density, etc), the selected inclination of the filtering walls 32,34 will be more pronounced, such as to have a greater portion of the gravitational force perpendicular to the filtering wall 32,34 forcing the liquid therethrough. A filtering floor such as shown in FIGS. 3-4 is also preferred for such materials that are more difficult to filter. The proper combination of floor type and wall inclination can be determined by testing with a sample of the material to be filtered.

Adapting the inclination of the filtering walls and the type of filtering floor to the material to be filtered allows for a same filtering membrane to be used for different materials, i.e. the size of the filter openings in the filtering walls can be kept constant. This allows for standard filtering wall panels to be manufactured, a specific filtration system being assembled for a specific material to be filtered by choosing the appropriate type of filtering floor and inclination angle of the filtering walls.

The embodiments of the invention described above are intended to be exemplary. Those skilled in the art will therefore appreciate that the foregoing description is illustrative only, and that various alternatives and modifications can be devised without departing from the spirit of the present invention. Accordingly, the present invention is intended to embrace all such alternatives, modifications and variances which fall within the scope of the appended claims.

We claim:

1. A filtration system for separating at least one target solid from a sludge, the filtration system comprising:
    a transportable open-topped box having a horizontal floor panel and a plurality of wall panels upwardly extending from the floor panel and connected to each other and to the floor panel to define a sealed enclosure within the box, the wall panels of the box extending substantially perpendicularly upward from the floor panel;
    a filtering assembly disposed within the box, the filtering assembly having filtering walls and a filtering floor connected together to enclose a filter chamber within which the sludge is received, the filtering walls including two end filtering walls and two long side filtering walls, the two long side filtering walls extending along a longitudinal length of the box, each of the long side filtering walls being inclined with respect to a vertical plane defined by a corresponding one of the wall panels of the box such that a bottom edge of the long side filtering wall is located inward of a top edge thereof,
    wherein a first cavity longitudinally extends between each of the long side filtering walls and the corresponding one of the wall panels of the box, each said longitudinally extending cavity having a transversal width defined between an outer surface of the long side filtering wall and an inner surface of the corresponding one of the wall panels, the transversal width of the longitudinally extending cavity increasing continuously from the top edge of the long side filtering wall to the bottom edge thereof such as to define a triangularly shaped liquid evacuation channel formed between the filtering assembly and the box along the longitudinal length thereof, wherein the triangularly shaped liquid evacuation channel provides greater liquid evacuation capacity at its wider lower end than at its narrower upper end;
    the filtering floor of the filtering assembly being inclined with respect to the underlying horizontal floor panel of the box such as to define a second cavity therebetween, the second cavity having a height defined between the horizontal floor panel of the box and the inclined filtering floor of the filtering assembly, the height of said second cavity increasing continuously from a first end of the filter chamber, wherein the filtering floor meets one of said end filtering walls, to a longitudinally opposed second end of the filter chamber, wherein the filtering floor meets the other one of said end filtering walls;
    the filtering assembly including a filtering partition extending upwardly from the filtering floor along a longitudinal length of the filter chamber, the filtering partition including laterally spaced apart filter panels inclined with respect to the vertical plane and defining a third cavity therebetween, the third cavity having a transversal width that increases continuously from an upper end thereof to a lower end thereof such as to define a second triangularly shaped liquid evacuation channel which provides greater liquid evacuation capacity at its wider lower end than at its narrower upper end;

a plurality of openings defined in the filtering walls and the filtering floor, the plurality of openings being sized to let liquid pass through and retain the at least one target solid of the sludge within the filter chamber;

an inlet in fluid communication with the filter chamber; and an outlet in the box in fluid communication with the first, second and third cavities, the outlet being defined at the first end of the box wherein the height of the second cavity defined between the filtering floor and the horizontal wall panel is the smallest;

whereby the sludge enters the filter chamber through the inlet, the at least one target solid being retained within the filter chamber while liquid reaches the first, second and third free spaces through the plurality of openings before being evacuated through the outlet.

2. The filtering system according to claim 1, wherein the inclination of the long side filtering walls with respect to the vertical plane is about 10 degrees.

3. The filtering system according to claim 1, wherein the plurality of openings are circular and have a diameter between 0.1 and 1 millimeters.

4. The filtering system according to claim 1, wherein the box is transportable by a truck.

5. The filtering system according to claim 1, wherein the filtering assembly includes a channel structure supporting a wire mesh, the wire mesh supporting a filtering material including the plurality of openings.

6. The filtering system according to claim 1, wherein the plurality of openings are sized to prevent a desired portion of solids contained in one of manure, waste from an agri-food industry, industrial sludge, used water, and wet contaminated soil from passing therethrough.

* * * * *

UNITED STATES PATENT AND TRADEMARK OFFICE
CERTIFICATE OF CORRECTION

| | |
|---|---|
| PATENT NO. | : 7,410,576 B2 |
| APPLICATION NO. | : 11/582310 |
| DATED | : August 12, 2008 |
| INVENTOR(S) | : Marc-André Brouillard et al. |

It is certified that error appears in the above-identified patent and that said Letters Patent is hereby corrected as shown below:

Title Page, Item (75) Inventors:
The second named inventor should read: Gaetan Brouillard and not Gastan Brouillard as shown.

Title Page, Item (73) Assignee:
The assignee's name should read: E.A.I. Technologies and not E.R.I. Technologies as shown.

Signed and Sealed this

Eleventh Day of November, 2008

JON W. DUDAS
*Director of the United States Patent and Trademark Office*